(12) United States Patent
Wang et al.

(10) Patent No.: US 8,909,007 B2
(45) Date of Patent: Dec. 9, 2014

(54) CIRCUIT SWITCHABLE OPTICAL DEVICE

(75) Inventors: Shih-Yuan (S Y) Wang, Palo Alto, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 12/915,964

(22) Filed: Oct. 29, 2010

(65) Prior Publication Data

US 2012/0105944 A1   May 3, 2012

(51) Int. Cl.
*G02B 6/26* (2006.01)
*G02B 6/35* (2006.01)
*G02B 6/43* (2006.01)

(52) U.S. Cl.
CPC ............ *G02B 6/3514* (2013.01); *G02B 6/3556* (2013.01); *G02B 6/43* (2013.01)
USPC ................... 385/18; 385/16; 385/17; 385/19; 385/20; 385/24

(58) Field of Classification Search
USPC .......................................................... 385/16
See application file for complete search history.

(56) References Cited

U.S. PATENT DOCUMENTS

| | | | |
|---|---|---|---|
| 6,501,869 B1 | 12/2002 | Athale | |
| 6,760,503 B1* | 7/2004 | Hermann | 385/17 |
| 6,813,407 B2* | 11/2004 | Ramaswami et al. | 385/16 |
| 6,839,478 B2 | 1/2005 | Huber et al. | |
| 7,003,188 B2 | 2/2006 | Hsu et al. | |
| 7,068,871 B2* | 6/2006 | Sugama et al. | 385/14 |
| 7,174,065 B2 | 2/2007 | Lacey et al. | |
| 7,526,203 B2* | 4/2009 | Tamil | 398/54 |
| 2003/0053741 A1* | 3/2003 | Hoke et al. | 385/17 |
| 2003/0164997 A1* | 9/2003 | Orcutt et al. | 359/223 |
| 2006/0215954 A1* | 9/2006 | Jenkins et al. | 385/18 |
| 2009/0232446 A1 | 9/2009 | Nagy et al. | |
| 2011/0211787 A1* | 9/2011 | Kuo et al. | 385/24 |
| 2013/0058607 A1* | 3/2013 | Binkert et al. | 385/16 |

FOREIGN PATENT DOCUMENTS

GB          2193816 A  *  2/1988

OTHER PUBLICATIONS

Wood et al, "MEMS 2-D Matrix Switch", OFC Mar. 2002, pp. 91-94.*

* cited by examiner

*Primary Examiner* — Hemang Sanghavi (57) ABSTRACT

A circuit switched optical device includes a first array of intersecting hollow waveguides formed in a first plane of a substrate. A second array of intersecting hollow waveguides is formed in a second plane of the substrate, and the second plane is positioned parallel to the first plane. An optical element within the first array selectively redirects an optical signal from the first array to the second array.

14 Claims, 8 Drawing Sheets

CIRCUIT SWITCHABLE OPTICAL DEVICE

BACKGROUND

As computer chip speeds on circuit boards increase to ever faster speeds, a communications bottleneck in inter-chip communication is becoming an increasing concern. One solution may be to use fiber optics to interconnect high speed computer chips. However, most circuit boards involve many layers and often involve tolerances in their manufacture of less than a micron. Physically placing fiber optics and connecting the fibers to the chips can be too inaccurate and time consuming to be widely adopted in circuit board manufacturing processes. Furthermore, routing the optical signals around and between circuit boards can add significant additional complexity. Marketable optical interconnects between chips have therefore proven elusive, despite the need for broadband data transfer.

DETAILED DESCRIPTION

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

Light beams or optical signals are frequently used to transmit digital data. For example, optical signals can be used to transmit data over large distances, between electronic components on nearby circuit boards, or between electronic components on a single circuit board. For large scale interconnections between multiple electronic components, an optical fabric can be used which can have a number of characteristics, including the ability to connect any or all of the inputs to any or all of the outputs with a minimal number of components. An optical fabric can also have a high coupling efficiency, modularity, high reliability, an ability to reroute a workload to eliminate system congestion, and low cost.

Optical signals can be routed using waveguides. Waveguides can carry optical energy by imposing boundaries which control the expansion of the optical energy and guide the optical energy or optical signals to a desired location. Optical communication can also provide interconnection between the optical channel and various other devices such as backplanes, electronic devices, semiconductor lasers, photo-detectors, other components. An optical interconnect between waveguides with optical switches have a high coupling efficiency, low cost, reconfigurability, and can produce a reliable connection.

A hollow waveguide, such as a hollow metal waveguide, can be efficiently and inexpensively used in a circuit switched optical crossbar fabric. Hollow metal waveguides typically include a hollow air core surrounded by highly reflective metallic wall. Hollow metal waveguides are typically fabricated in any of a variety of substrates, including silicon. A variety of patterning processes including sawing, laser machining, wet and dry etching, and other suitable processes can be used to form the hollow metal waveguides. For example, some forms of plastic molding are used to create trenches which can be metalized to form hollow metal waveguides. According to a more specific example, the sidewalls and bottom of these trenches are metalized using a sputtering process to provide a highly reflective surface at the wavelengths of interest. Silver can be sputter-coated into the trenches to provide the reflective coating. The silver can be overcoated with a passivation layer, such as aluminum nitride, which can protect the coating and prevent oxidization. An undercoat may also be provided to improve the adhesion of the silver layer to the substrate. A waveguide cap can also be bonded or patterned on the substrate to cover the trenches and complete the hollow metal waveguides. Typical dimensions of a hollow metal waveguide cross-section may be approximately 150 microns×150 microns or 300 microns× 300 microns, for example. That being stated, the size and geometry of the waveguides can be altered according to the specific design for single or multimode optical properties.

Low index air cores of the hollow metal waveguides produce various effects not found in polymer core waveguides. Hollow metal waveguides offer the potential of low optical loss, low bend loss, and low modal dispersion required in optical interconnect systems. In contrast to polymer or other solid waveguides, the hollow metal waveguides do not have reflective losses at the input and output facets. In fact, some silver-coated hollow metal waveguides fabricated in silicon have achieved losses lower than 0.05 dB/cm. Air cores of the hollow metal waveguides produce very little optical dispersion, which allows the hollow metal waveguides to transmit data at rates approaching terahertz frequencies.

With this in mind, a circuit switched optical device in accordance with an example of the present technology includes a first array of intersecting hollow waveguides formed in a first plane of a substrate. A second array of intersecting hollow waveguides is formed in a second plane of the substrate, and the second plane is typically parallel to the first plane. An optical element within the first array selectively redirects an optical signal from the first array to the second array.

Alternatively, a method for switching a circuit switched optical device is also disclosed and will be discussed in greater detail hereinafter. That being said, it is noted that when discussing circuit switched optical device or the method of switching the same, each of these discussions can be considered applicable to each of these examples, whether or not they are explicitly discussed in the context of that example. Thus, for example, in discussing details about the circuit switched optical device per se, or the method, such discussion also refers to the other example, and vice versa.

That being stated, computers and other devices can be optically connected and optically switched using the circuit switched optical device. For example, the circuit switched optical device can optically couple backplanes, blades, and other devices in a server. As used herein, it is noted that the term "backplane" refers to a structure which has multiple communication channels which can be accessed through a number of integrated sockets or other receptacles. For example, a backplane may contain a common bus to which a number of separate devices may connect. Backplane communication channels may include electrical wires, optical fibers, hollow metal waveguides, or other channels. The backplane may contain optical to electrical transducers, signal processing electronics, various types of light sources. Where the term "optical backplane" is used, the backplane includes at least one channel which is configured to convey optical signals through the backplane.

An optical interconnection fabric according to an example of the present disclosure includes dynamically reconfigurable circuit switched optical crossbars which allow X input nodes to connect to any of Y output nodes across Z layers of waveguide arrays. The values of X, Y, and Z are limited only by space and desired complexity. That being said, in one specific example, X and Y can independently be from 2 to thousands (or even more), and Y can be from 2 to hundreds (or even more), though these numbers are not intended to be limiting. The optical crossbars can be created using a low cost injection molding processes. A number of crosspoints or intersections can route optical signals from the input nodes to the output nodes. The crosspoints can be implemented in a variety of ways, including mechanical actuators or multicasting to all outputs and controlling the connections using light valves. Crosspoints can switch an input to a desired output in a matter of tens of milliseconds, tens of microseconds, or less.

Figure 1:
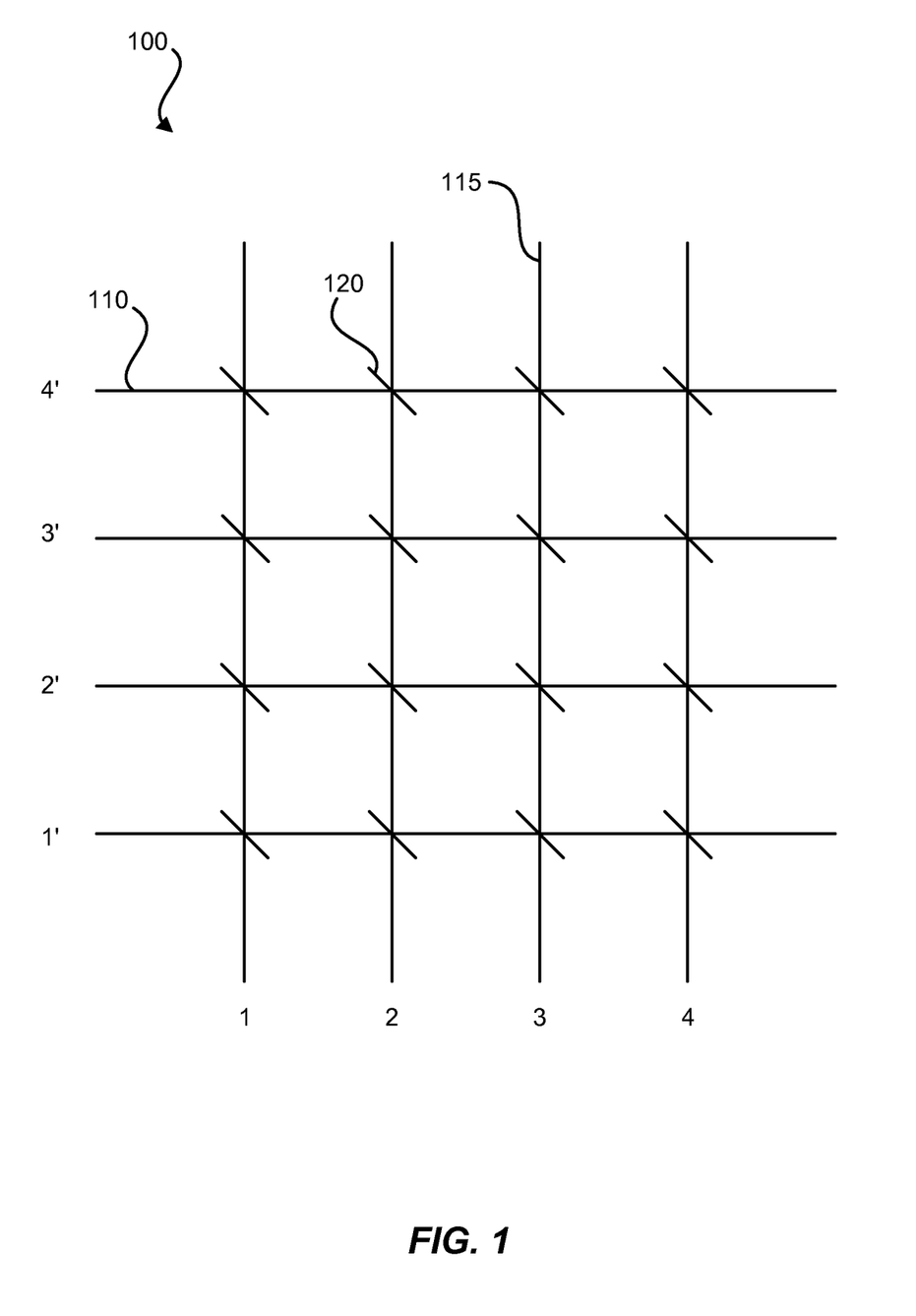
FIG. 1 is a schematic view of a layer of an optical crossbar switch in accordance with examples of the present disclosure.

Turning now to the FIGs., FIG. 1 is schematic diagram of a circuit switched optical crossbar fabric 100 which connects four bus ports to four input/outputs (I/O) ports. A number of horizontal lines representing waveguides run from left to right and intersect each of a number of vertical lines, also representing waveguides. Each of the vertical lines connects to one of the input/output ports. For convenience, the horizontal lines can be called "bus lines" 110 and the vertical lines can be called "tap lines" 115. As used herein, the term "crossbar" or "crossbar configuration" refers to two or more optical paths which intersect. The intersection of the bus lines and the tap lines create an optical crossbar fabric. In one example, the bus lines can be formed in an array of parallel waveguides which intersect the tap lines at approximately a 90 degree angle, though other angles can be used in other examples.

The bus lines 110, numbered 1'-4', can carry input and output signals through the optical fabric. The tap lines 115, numbered 1-4, can be selectively connected to the bus lines to connect a bus port to an I/O port. A computational element, such as a computer, router, electronic switch or other device with E/O or O/E (electrical to optical, optical to electrical signal converters) can be connected to the input/output port(s) which can be optical signal in and optical signal out ports.

The bus lines 110 and tap lines 115 may be hollow metal waveguides. At each intersection between the bus and tap lines, an optical element 120 can be selectively actuated to direct optical energy between the intersecting lines. By configuring an optical crossbar fabric at the intersections in this manner, each of the signals carried by in a bus line can be directed to any of the outputs.

A crosspoint or optical switch can have at least two configurations: a through state and a crossed state. In a through state, bus lines can carry signals through an optical fabric. For example, the bus lines can carry bidirectional signal traffic by dividing the lines into two groups. Similarly, the tap lines can be divided into groups for bidirectional signal traffic. Bus lines in the through state can pass through the optical switch without diversion into the tap lines. The signal carried by the bus lines can then be received by another component connected at another location along the bus lines.

In a crossed state, the optical switch can diverts the bus lines into the tap lines. A component attached to the tap lines can establish bidirectional communication with devices through the bus lines and tap lines. The optical switch may have a variety of configurations and use a number of technologies to redirect optical signals to the tap lines.

For purposes of illustration and explanation, a relatively small number of bus lines and tap lines have been illustrated. The optical switch could have fewer or greater numbers of lines, according to specific systems and applications.

Figure 2:
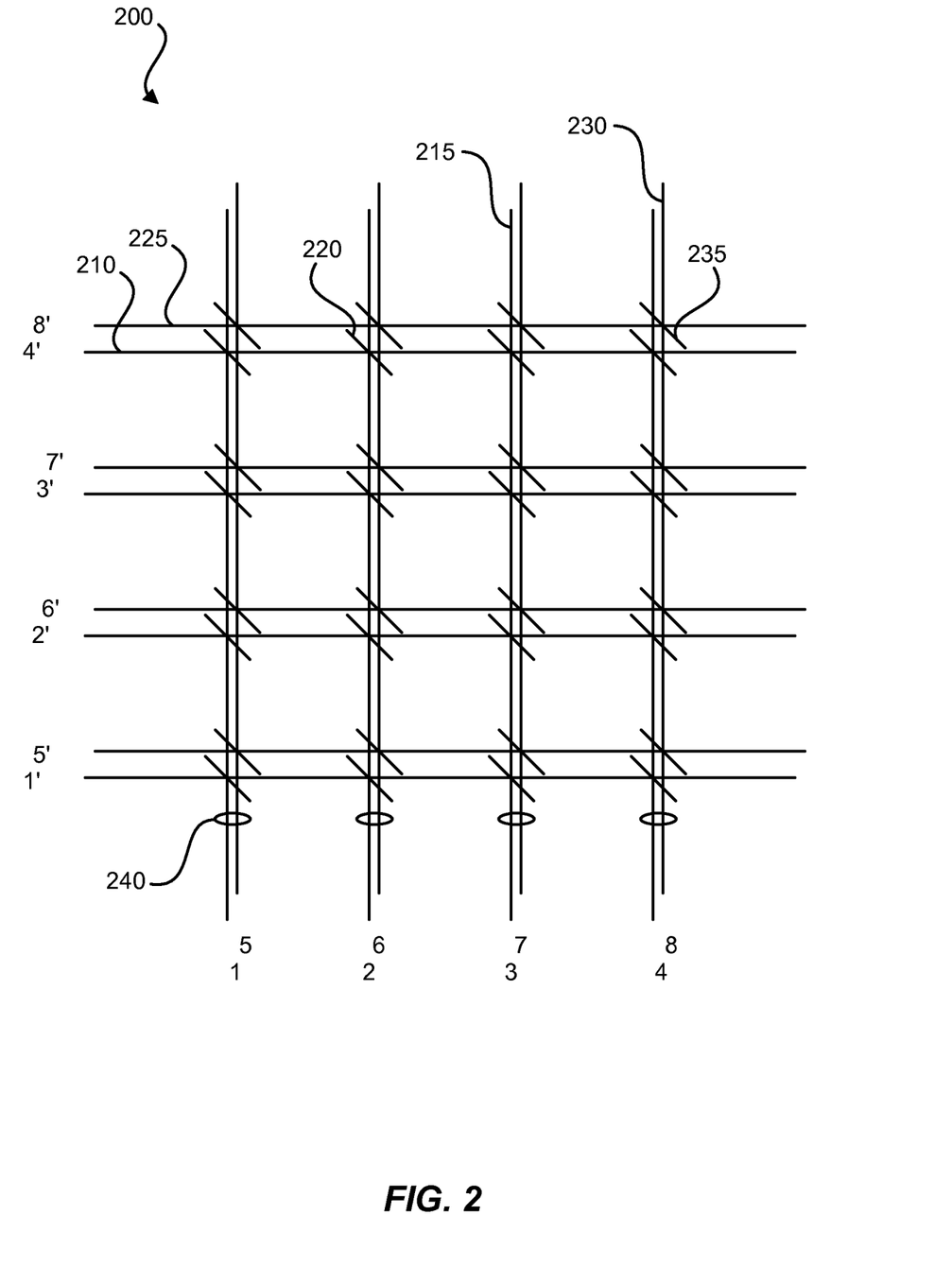
FIG. 2 is a schematic view of stacked layers in an optical crossbar switch in accordance with examples of the present disclosure.

Referring to FIG. 2, the optical crossbar fabric can be substantially duplicated in another layer which can be stacked on top of the optical crossbar fabric described in FIG. 1. Any desired number of layers of optical crossbar fabrics can be stacked to provide an optical switch for switching optical signals between any desired numbers of devices. Stacking layers of optical crossbar fabrics in this manner can enable a more densely organized switching fabric with a smaller footprint than if a same number of ports were organized within a single layer. For example, a switch may service a grid of 1000×1000 ports. Arranging the switching fabric in a cube rather than a plane can result in a more compact switch.

The use of individual optical devices in the intersections between bus and tap lines can result in very fast switching times between the through and crossed states. A low mass of the optical devices can allow for fast motion with minimal power. Further, in examples where the optical devices are individually actuated, the optical switch can provide increased flexibility in routing the optical signals. For example, in applications where signal throughput to a computing device attached to the tap lines is not a deciding factor, only a few of bus lines may be diverted into the tap lines. The remainder of the bus lines can then be used to carry other traffic. Optical devices used for directing an optical beam between layers can be placed at the intersections or outside of the intersections. In examples where each intersection includes an optical device for optical routing within a layer, optical devices for interlayer redirection can be placed at each of the tap lines or each of the bus lines, in each of the intersections, etc. In another example, a single optical device for interlayer redirection may be provided for each layer and the optical devices at the intersections can be used to redirect an optical beam to the interlayer redirection optical device, and from there to a desired port.

FIG. 2 is diagram of stacked circuit switched optical crossbar fabrics 200 which can separately connect four bus ports to four input/outputs ports or together can connect eight bus ports, numbered 1'-8', to eight input/output ports, numbered 1-8. Each optical crossbar fabric layer can operate separately and independently in the manner as has been described. A first waveguide layer can include bus lines 210, tap lines 215, and optical devices 220 in intersections of the bus and tap lines. A second waveguide layer can include separate bus lines 225, tap lines 230, and optical devices 235.

An interlayer waveguide 240 can also be included between the optical crossbar fabric layers to facilitate transmission of a signal from one layer to another layer. The interlayer waveguide can be formed similarly to the waveguide arrays in the single layer array described in FIG. 1. Where sidewalls of the waveguides in the waveguide arrays are metallized to keep the optical signal within the waveguide, the interlayer waveguide can be at a point of non-metallization to enable the optical signal to travel out of the waveguide at a direction orthogonal to a plane of the waveguide array. The length of the interlayer waveguide can be the thickness between stacked waveguides. Thus, for example, if a metallization layer is all that separates stacked waveguides, the interlayer waveguide length may be minimal, or even negligible. In this example, the interlayer waveguide may simply comprise the passageway from one waveguide layer to another waveguide layer. In other examples, a layer having a measurable or significant thickness may exist between stacked waveguide arrays. In this example, sidewalls of the interlayer waveguide can be metallized such that an optical beam will be directed along the interlayer waveguide as with other waveguides in the waveguide layers.

An optical signal can be directed along the interlayer waveguide using an optical element. The optical element for directing an optical signal between layers can be the same optical element as is used in the intersections to direct a signal from a bus port to an I/O port, or can be an optical element set outside of an intersection. For example, FIG. 2 illustrates optical elements at the waveguide array intersections and separate optical elements outside of the intersections for direction an optical beam from one layer to another layer.

Figure 3:
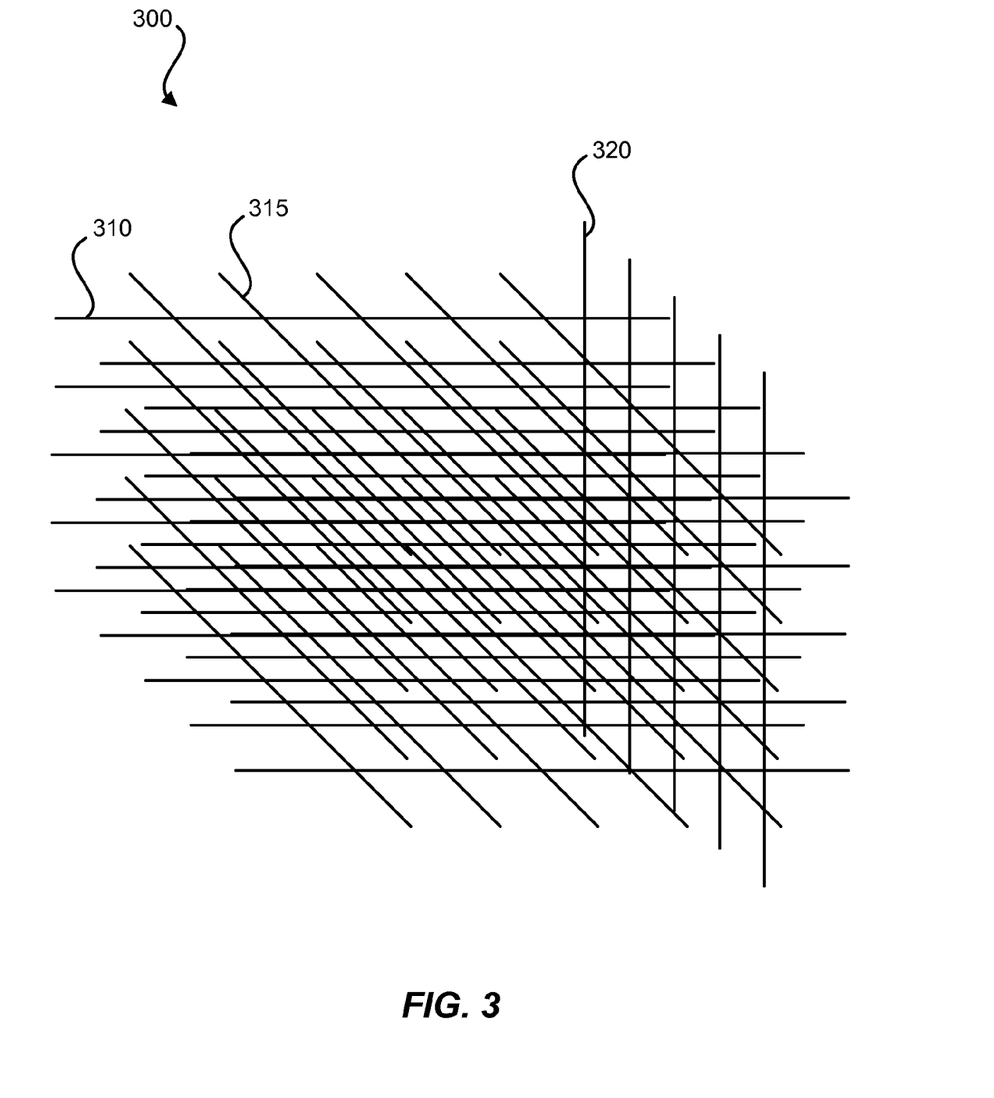
FIG. 3 is a three-dimensional schematic view of stacked optical crossbar switch layers in accordance with examples of the present disclosure.

Referring to FIG. 3, a three-dimensional schematic view is shown of stacked optical crossbar switch layers 300 in accordance with an example. Bus lines 310 and tap lines 315 are arranged in grid patterns in the layers, and interlayer waveguides 320 intersect the bus lines outside of an intersection near an end of the bus lines. In a related example, a three-dimensional schematic view can include stacked optical crossbar switch layers that are present at every intersection, rather than just at single end of a bus line or a tap line. In another example, a multi-layer grid or cube of waveguides includes only a single interlayer waveguide for connecting all of the layers.

The interlayer optical element and/or the optical elements at the intersections may comprise micro-electro-mechanical system (MEMS) devices. The MEMS devices can be positioned in a substrate beneath, above, or to the side of a waveguide wall. The MEMS devices can include a mirror, a polarizer, a prism, a lens, or other type of optical device for directing or conditioning an optical beam. The MEMS devices can include an actuator for moving the optical elements. The actuator can be configured to switch or move an attached optical element between positions in approximately 20 ms (milliseconds) or less.

Figure 4:
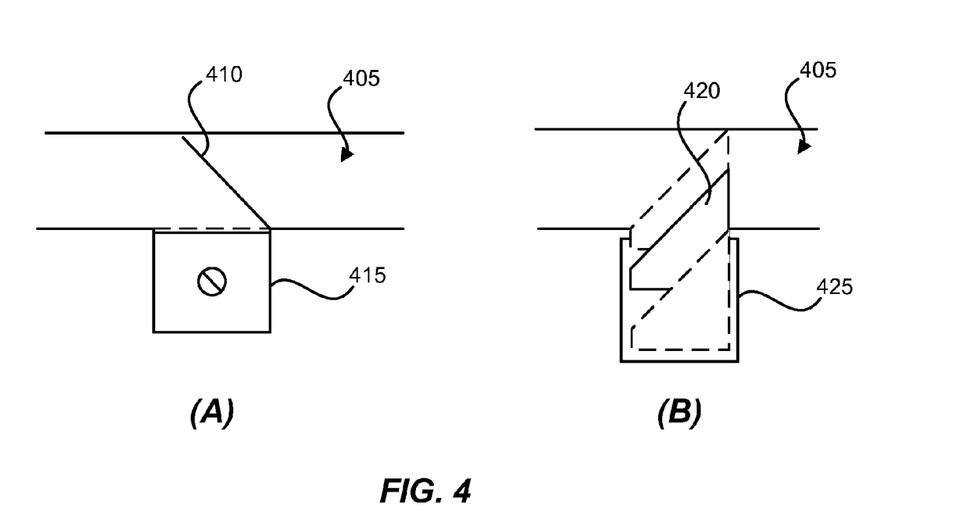
FIG. 4 includes block diagrams of micro-electro-mechanical system actuated optical devices in accordance with examples of the present disclosure.

As illustrated in FIG. 4, the MEMS device can have a variety of configurations. In example (A), the MEMS device includes a mirror 410 hingedly mounted on an edge of the mirror near a wall of a waveguide 405. The mirror can swing upward or downward at the hinge using an actuator 415 to move into and out of a path of an optical beam. When the mirror is moved out of a path of the optical beam, the mirror can be substantially flush with a sidewall of the waveguide such that transmission of the optical beam past the mirror is not inhibited. In one example, two such MEMS actuated mirrors can be used to direct a light beam from one waveguide to another, turning the light beam propagation direction by 90 degrees. In example (B), the MEMS device includes a mirror or reflective block 420 which is moved upward and downward using an actuator 425 to move into and out of the pathway of the optical beam. In other configurations, a mirror or other optical device can be positioned in a number of different positions. Thus, the MEMS device can move the mirror in one position to redirect an optical beam along a different waveguide in a same waveguide layer, and can move the mirror into another position to redirect the optical beam to a different waveguide layer. The MEMS device can also move the mirror out of the waveguide path to not redirect the optical beam. In another example, multiple MEMS devices can be included at a single waveguide intersection, where one device redirects an optical beam within the same waveguide layer and another device redirects the optical beam to a different waveguide layer.

The optical device can have a variety of different characteristics depending on a particular application. For example, the optical device can include a partially reflective film or plate. As another example, the optical device can include a beam splitter. The beam splitter can be a generic or 50-50 (or any other ratio) beam splitter which splits the optical beam and redirects approximately one half of the optical beam while transmitting another approximately one half of the optical beam without redirection. As another example, the beam splitter can be a dichroic beam splitter to transmit a portion of the optical beam at a first wavelength and redirect a portion of the optical beam at a second wavelength. The beam splitter can be a dielectric beam splitter or a cube beam splitter. The beam splitter can be a polarizing beam splitter or a wire grid polarizing beam splitter and can split an optical beam according to polarization.

The optical device can have a width or height substantially similar to a width or height of a waveguide in which the optical device is disposed. In another example, the optical device can have a width or height less than the width or height of the waveguide in which the optical device is disposed. For example, the optical device can have a width half as wide as a width of the waveguide. Thus, the optical device may only affect a portion of the optical beam which is incident on the optical device.

Figure 5:
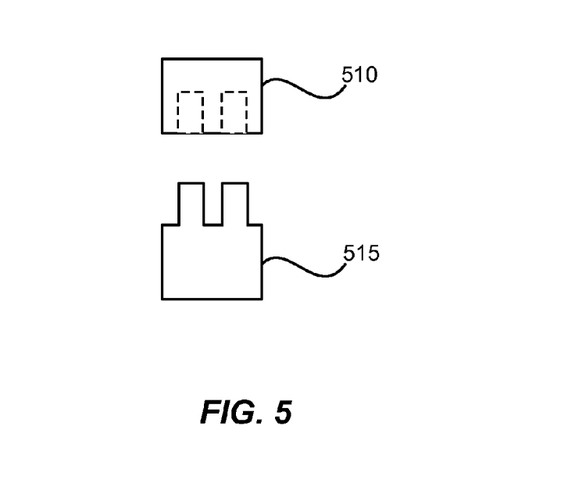
FIG. 5 is a block diagram of an optical device including multiple independently movable portions in accordance with examples of the present disclosure.

The optical device can be a mirror for reflecting and/or redirecting an optical beam. In one example, the mirror can be made of multiple parts. For example, as shown in FIG. 5, the mirror may include two mirror halves or portions 510, 515. The mirror halves can be independently movable. The mirror portions can be independently movable using a same MEMS device or may be operated using multiple MEMS devices. For example, one mirror portion may be extended into the waveguide into a path of an optical beam while another mirror portion is positioned partially or entirely out of the path of the optical beam. The mirror portions can be made to interlock or fit together within a waveguide or waveguide intersection.

The use of beam splitters, mirrors that extend only partially into a waveguide, MEMS devices which can selectively determine an extent to which an optical device extends into a waveguide, and so forth, can be used for multicasting or broadcasting an optical signal. Also, the use of dichroic or polarizing optical devices can enable monitoring of a wavelength or polarization of the optical signal.

Figure 6:
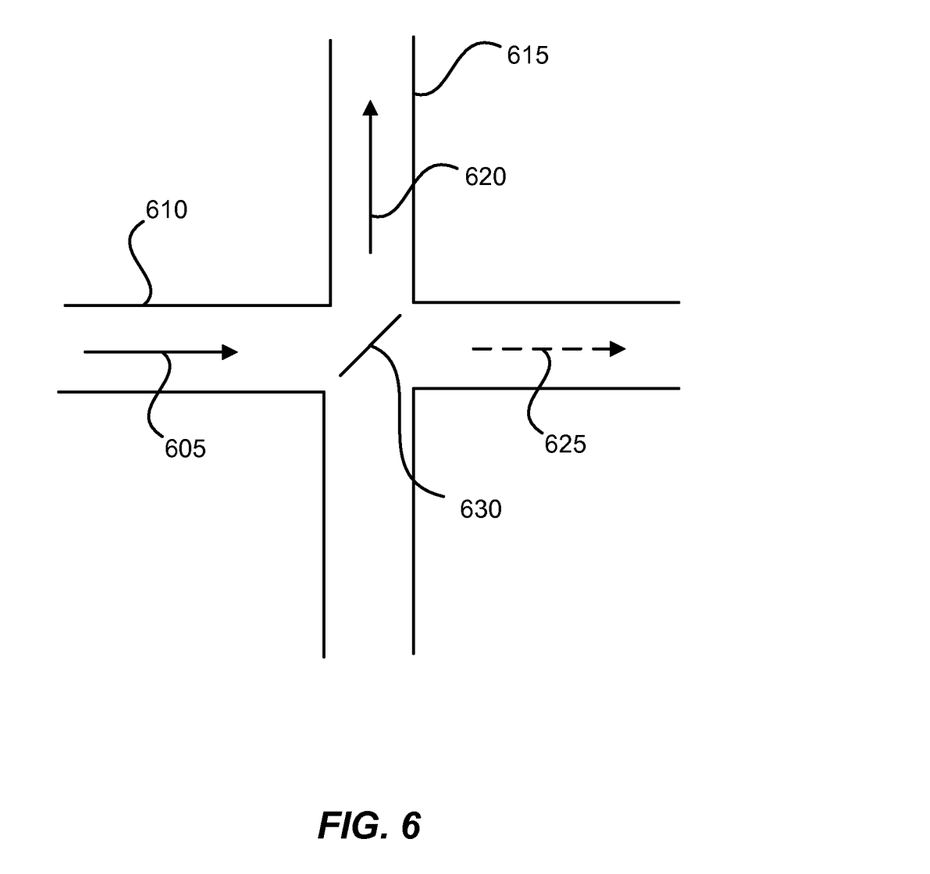
FIG. 6 is a block diagram of an intersection of a waveguide in a layer of an optical switch fabric with an interlayer waveguide in accordance with examples of the present disclosure.

Any of the described variations in optical device configurations can be used at any of the intersections and/or for interlayer communication. Thus, for example, an optical beam from a bus line may be split at an intersection using a 50-50 beam splitter such that half of the optical signal is redirected along a tap line and the other half continues along the bus line. The half that continues along a bus line may then encounter a dichroic beam splitter that redirects green light within the optical beam to a different layer and transmits red light along the bus line. FIG. 6 illustrates an example configuration where an optical beam 605 transmitted along a waveguide bus or tap line 610 is split using a beam splitter 630 and a portion 620 of the optical beam is redirected along an interlayer waveguide 615. Another portion 625 of the optical beam is transmitted along the tap line. The light directed to a different layer can be redirected into a bus line or a tap line. The waveguide arrays at different layers can be aligned, offset, skewed, etc., as desired and the interlayer waveguide can connect waveguides in different layers. The optical devices can be rotated or positioned such that the optical beam can be efficiently and accurately redirected between the switching fabric layers. Also, the waveguide arrays can be arranged in regular or grid-like patterns or can be arranged in irregular patterns.

Figure 7:
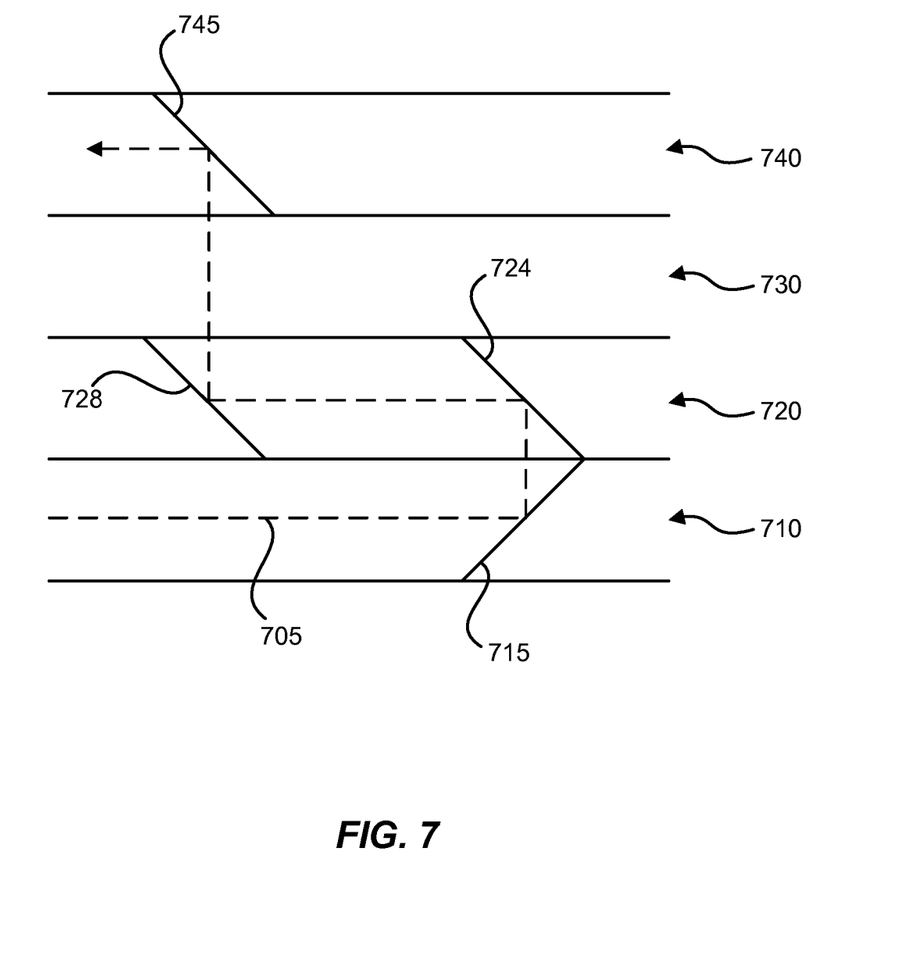
FIG. 7 is a block diagram of stacked waveguide layers and an optical path through the layers in accordance with examples of the present disclosure.

Referring to FIG. 7, an optical switch is made up of a first or bottom waveguide layer 710, a second waveguide layer 720, and a third or top waveguide layer 740, with a spacer layer 730 interposed between the second and third waveguide layers. The optical switch can be placed in a socket in a backplane. A number of hollow metal waveguides are formed in the backplane and intersect the socket. The optical switch can be configured to receive optical energy passing through the hollow metal waveguides and route the optical energy appropriately. An optical signal 705 can be received in a waveguide in the first waveguide layer through the socket and from a waveguide in the backplane. An optical device 715 can redirect the optical beam to the second layer where an optical device 724 in the second layer redirects the optical beam along a waveguide in the second layer. Another optical device 728 in the second layer can then redirect the optical beam up through the spacer layer to the third or top layer where an optical device 745 in the third layer redirects the optical beam within a waveguide in the third layer. The optical beam can then be transmitted to a device connected to a port in the third layer. In another example, the optical beam in the third layer can be transmitted back to the backplane to a different waveguide than the original optical beam.

In another example, the spacer layer can be a waveguide layer similarly to the first, second, and third layers. An optical device in the spacer layer can be positioned out of the path of the optical beam between the second and third layers such that the optical device in the spacer layer has no effect on the optical beam passing through the spacer layer. In another example, the optical beam path illustrated in FIG. 7 can proceed directly from the first layer to the third layer without interaction with the second layer.

In one example, the layers of waveguides can have cross sections which are approximately 150 microns×150 microns. The center to center distance between two stacked waveguides can be approximately 250 microns.

In another example, each of the tap lines may contain a light valve. The light valves can selectively block or transmit optical signals through the tap lines. By controlling the transmission of optical signal through the tap lines, the light valves can configure the optical fabric to interconnect specific elements attached to the fabric. A number of bus ports or light sources can be attached to each bus line. As beams from the light sources are diverted into the tap lines, the beams can encounter the light valves. If the light valve for a particular input/output port is open, the light can be transmitted out through the port. Use of light valves can be valuable, for example, when broadcasting a signal to a large number of ports, but not to all ports.

One challenge in designing an optical crossbar fabric is budgeting and reducing optical losses that are experienced by an optical signal traveling through the system. Each time the optical signal encounters an obstacle or discontinuity in its path, a portion of the light may be lost due to absorption and/or scattering. In general, the more elements the optical signal encounters, the higher the losses within the fabric. Further, certain types of elements can introduce greater losses than other elements. Consequently, to reduce the optical losses an overall number of elements optical signal encounters within the optical fabric can be reduced and the use of each element can be weighed against the benefit provided.

Figure 8:
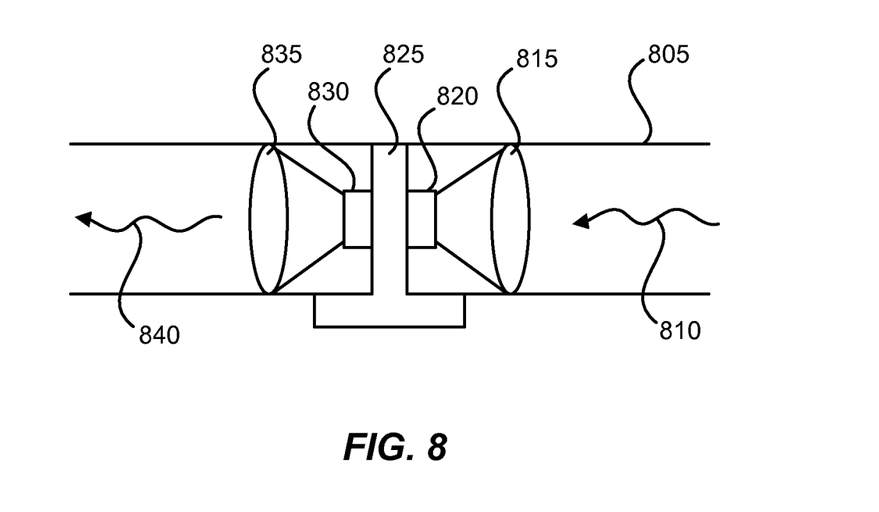
FIG. 8 is a block diagram of an optical-electrical-optical conversion device in a waveguide in accordance with examples of the present disclosure.

Referring to FIG. 8, an optical-electrical-optical (OEO) device is illustrated for restoring an optical signal. The OEO device can be sized and shaped to be implemented within a hollow metal waveguide 805. As a weak signal 810 approaches the OEO device from the right, a lens 815 can be used to collimate the light and focus the light to a photodetector 820. The photodetector can generate an electrical signal based on the light received. An application specific integrated circuit (ASIC) chip 825 can condition the electrical signal generated by the photodetector. For example, the ASIC can increase a strength of the electrical signal and/or remove noise from the electrical signal. The ASIC can send the conditioned electrical signal to a vertical-cavity surface-emitting laser (VCSEL) 830 or other suitable light source. The VCSEL can emit or broadcast a restored optical signal 840. The OEO device can also include another lens 835 for collimating or shaping the restored optical signal for transmission along the waveguide to the left.

An optical switch can include any number of OEO devices. For example, an OEO device may be provided in each waveguide layer. As another example, a single OEO device may be provided for an entire optical switch. The optical switch can include logic circuitry or be in communication with a memory and/or processor to be able to determine when an optical path for an optical signal will weaken the optical signal sufficiently that use of the OEO device on the signal will be useful for providing a sufficient output signal. For example, when an optical path is particularly long, includes more than a predetermined number of turns, or encounters specific optical devices or other features which are known to cause signal loss, the optical switch can reroute the optical path to pass through the OEO device before reaching the destination. In another example, optical detectors can be included in the waveguides to detect optical signal strength. When the signal strength drops below a predetermined strength, the switch can dynamically reroute the optical beam to a nearest OEO before the optical beam reaches the destination.

Measurements and modeling have shown that losses at individual intersections can be comparatively minimal. For example, where in input beam is directly transmitted to an output, or transmitted with only one or two turns, an exiting beam may have approximately 99% or more of the intensity of the input beam. However, in designs where the optical signal encounters large numbers of intersections the loss can be significant. For example, in an optical fabric having 32 tap lines for each computing element, if 16 computing elements are interconnected using the optical fabric, then a given line may encounter as many as 512 intersections. Using a worst case scenario, a magnitude of the exiting optical signal beam after encountering 512 intersections may be only about 2% of the original input magnitude. At some point along the path among the 512 intersections, the optical beam can be directed to an OEO device and strengthened such that the exiting optical beam has a signal strength within a predetermined range from the original signal strength. For example, the optical switch can be designed to ensure that all exiting optical beams have a signal strength of at least 25% or 50% of the original signal strength. A minimally acceptable signal strength may be determined based on a specific application or system configuration.

The OEO can be formed separately from the circuit switched optical device or as a part of the circuit switched optical device. For example, if the OEO is separate from the circuit switched optical device, an optical fiber can carry light from a waveguide to the OEO for conditioning and another optical fiber can carry the conditioned light from the OEO to the same or a different waveguide. As another example, the OEO can be formed separately from the circuit switched optical device and inserted into the waveguide. As another example, the OEO can be formed integrally with the circuit switched optical device in a waveguide of the circuit switched optical device such that the OEO and the circuit switched optical device can be a single integrated device. By positioning an integrally or separately formed OEO in the waveguide, an additional expense of attaching optical fibers to the waveguide(s) and the OEO can be eliminated.

The optical crossbar fabrics described above can be used in a variety of applications. For example, a computer system which includes a number of blade computers can be connected to the optical crossbar fabric. The optical crossbar fabric can include a number input/output ports connected to bus lines. The tap lines can be connected to the bus lines at intersections. Different layers of waveguides can be connected to different blade computers, and bus and/or tap lines in one layer can be in optical communication with bus and/or tap lines in another layer. The tap lines can be connected to the blades. For example, the blades can be connected to the tap lines through a PCI-E (Peripheral Component Interconnect Express) connector with 16 transmit lines and 16 receive lines, for a total of 32 lines per blade.

Figure 9:
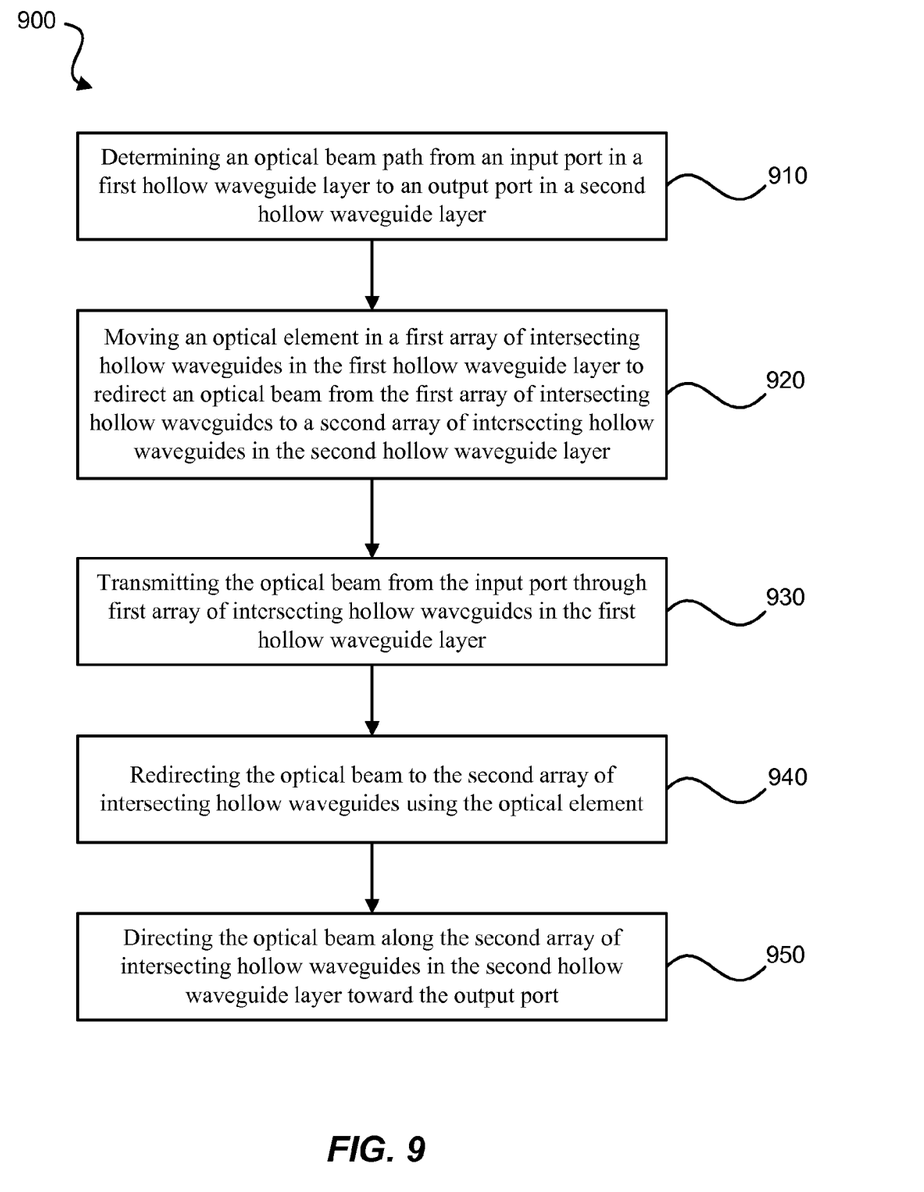
FIG. 9 is a flow diagram of a method for switching a circuit switched optical device in accordance with examples of the present disclosure.

FIG. 9 is a flow diagram of a method 900 for switching a circuit switched optical device in accordance with an example of the present disclosure. The method can include determining 910 an optical beam path from an input port in a first hollow waveguide layer to an output port in a second hollow waveguide layer. The optical path can also be split to include destinations in both the first and second hollow waveguide layer. The first and second hollow waveguide layer can be adjacent layers or have any number of layers interposed therebetween.

The method can also include moving 920 an optical element in a first array of intersecting hollow waveguides in the first hollow waveguide layer to redirect an optical beam from the first array of intersecting hollow waveguides to a second array of intersecting hollow waveguides in the second hollow waveguide layer. The method can also include moving an optical element in the second array to redirect the optical beam along a waveguide in the second array. The method can further include moving any number of other optical elements within the first and second arrays to selectively direct the optical beam along a desired path within the first and second hollow waveguide layers.

An additional step includes transmitting 930 the optical beam from the input port through first array of intersecting hollow waveguides in the first hollow waveguide layer. The optical beam can be redirected 940 to the second array of intersecting hollow waveguides using the optical element, and the optical beam can be directed 950 along the second array of intersecting hollow waveguides in the second hollow waveguide layer toward the output port.

The method can also include conditioning the optical beam using an optical-electrical-optical (OEO) device. For example, conditioning can include collimating the optical beam to efficiently launch the optical beam into the hollow waveguide. More specifically, the collimation of the optical beam can reduce a divergence angle of the optical beam so as to substantially match an acceptance angle for low loss propagation into hollow metal waveguides. In this example, a lens and source (or an array of lenses and sources) in the OEO can be internal or external to the hollow waveguide(s). Likewise, a second lens and a detector in the OEO can also be internal or external to the hollow waveguide(s).

In another example, conditioning the optical beam may comprise regenerating the optical signal (i.e., the optical beam) if the optical signal is too weak, such as by having a signal strength lower than a predetermined threshold.

The method can also include redirecting a portion of the optical beam and transmitting another portion of the optical beam. For example, the optical element may comprise a mirror having a plurality of mirror portions and the method may proceed by moving the plurality of mirror portions independently to selectively redirect a portion of the optical beam.

The method can also include moving an array of optical elements within the first hollow waveguide layer and the second hollow waveguide layer to direct a plurality of optical beams between input and output ports coupled to intersecting arrays of hollow waveguides in the first hollow waveguide layer and the second hollow waveguide layer.

The device and method described herein can be further described in accordance with a specific example. For example, the device and method can include a circuit switched optical crossbar fabric, which is formed with hollow metal waveguides at a first layer in a backplane to create an optical crossbar architecture. A first group of parallel crossbars may be bus lines which traverse the length of the backplane, while a second group of parallel crossbars may be tap lines which intersect the bus lines and are connected to a computing element. Additionally, an optical element or combination of optical elements in each intersection in the first layer can be configured to selectively direct optical signals from the bus lines into the tap lines and vice versa. These optical elements may include prisms, mirrors, light valves and other optical elements. The optical elements may be dynamic or passive. According to one illustrative example, one or more optical element in the intersection can change states to switch the interconnection from a through state to a crossed state. Further, hollow metal waveguides can be formed in a second layer in proximity to the first layer, and the first and second layers can be directly adjacent or may have any number of intervening layers. An optical element or combination of optical elements can be positioned to selectively direct optical signals from the bus lines into the tap lines and vice versa. Computing elements can be connected to the optical fabric. For example, a primary computing device or network may be connected to the bus lines and a number of other computing devices may be connected to the tap lines. Also, the bus lines may be connected to a larger computing network or router and the tap lines may be connected to a number of blade computers. Each of the blade computers may be connected to multiple tap lines. For example, each blade computer may use 16 tap lines for inbound communication and 16 tap lines for outbound communication. In other examples, the computing devices may use more or less tap lines for bidirectional communication. The computing device may also use, for example, 16 tap lines in a bidirectional manner. Additionally, the computing device may use wavelength division multiplexing for bidirectional communication over a given line set.

As discussed above, the bus ports may be connected in a variety of locations along the bus lines. In some examples, it may be advantageous to locate the bus ports at one end of the bus lines. In other examples, bus ports may be attached to the center of the bus lines and distribute optical signals in both directions through the bus lines. In general, the location of the bus ports on the bus lines can be determined by a number of factors including: space constraints, connection constraints, optical loss budgeting, or other relevant criteria.

Dynamically switching the optical elements within the crossbar optical fabric to connect desired tap lines to the bus lines can be carried out in some examples. For example, dynamically switching the optical elements may include separately switching a number individual elements or moving a block of elements with a single actuator. By way of example and not limitation, this switching may include moving a solid periscope prism into the path of a bus line, tilting mirror into the path of a bus line, or opening a light valve to allow passage of optical signals from a bus line into a tap line.

Furthermore, the optical signals from the tap lines can be directed to the computing element. In one example, the optical signal from multiple tap lines may be combined into a single tap line using a series of combiner elements. Additionally or alternatively, a single tap line may be simultaneously connected to two or more bus lines.

In sum, the optical interconnect fabric described above provides a number of advantages including: low cost, non-blocking configuration, low power, multicast capability and fast switching. The optical interconnect fabric can also connect a large number of devices in a more compact area by providing optical interconnection between layers of waveguides in the optical interconnect fabric. The various examples in the present disclosure are not mutually exclusive. Additionally, the various optical elements can be used separately, in conjunction with each other, or can be substituted for each other.

While the forgoing examples are illustrative of the principles of the present technology in particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A circuit switchable optical device, comprising:
   a first array of intersecting hollow waveguides formed in a first plane of a substrate;
   a second array of intersecting hollow waveguides formed in a second plane of the substrate, wherein the second plane is parallel to the first plane; and
   an optical element within the first array to selectively redirect an optical signal from the first array to the second array;
   wherein the optical element
      includes two or more independently movable portions.

2. The device of claim 1, wherein the first array of intersecting hollow waveguides and the second array of intersecting hollow waveguides comprise hollow metal waveguides.

3. The device of claim 1, wherein the first array of intersecting hollow waveguides comprises a plurality of hollow waveguides intersecting at an intersection and wherein the optical element is positioned at the intersection.

4. The device of claim 1, wherein the first array of intersecting hollow waveguides comprises a plurality of hollow waveguides intersecting at an intersection and wherein the optical element is positioned outside of the intersection.

5. The device of claim 1, wherein the optical element comprises a micro-electro-mechanical system.

6. The device of claim 1, wherein the optical element comprises a mirror.

7. The device of claim 1, wherein the optical element comprises a beam splitter.

8. The device of claim 1, wherein the optical element comprises two mirror portions.

9. The device of claim 1, further comprising:
   an optical-electrical-optical device to convert to electrical signal, amplify, and retransmit the optical signal.

10. A method for switching a circuit switched optical device, comprising:
    determining an optical beam path from an input port in a first hollow waveguide layer to an output port in a second hollow waveguide layer;
    moving an optical element in a first array of intersecting hollow waveguides in the first hollow waveguide layer to redirect an optical beam from the first array of intersecting hollow waveguides to a second array of intersecting hollow waveguides in the second hollow waveguide layer;
    transmitting the optical beam from the input port through first array of intersecting hollow waveguides in the first hollow waveguide layer;
    redirecting the optical beam to the second array of intersecting hollow waveguides using the optical element; and
    directing the optical beam along the second array of intersecting hollow waveguides in the second hollow waveguide layer toward the output port,
    wherein the optical element
       comprises a mirror having a plurality of mirror portions, the method further comprising moving the plurality of mirror portions independently to selectively redirect a portion of the optical beam.

11. The method of claim 10, further comprising conditioning the optical beam using an optical-electrical-optical device.

12. The method of claim 10, wherein redirecting the optical beam comprises redirecting a portion of the optical beam and transmitting another portion of the optical beam.

13. The method of claim 10, further comprising moving an array of optical elements within the first hollow waveguide layer and the second hollow waveguide layer to direct a plurality of optical beams between input and output ports coupled to intersecting arrays of hollow waveguides in the first hollow waveguide layer and the second hollow waveguide layer.

14. The method of claim 10, wherein the optical beam is directed through an optical-electrical-optical device to convert to electrical signal, amplify, and retransmit the optical signal.

* * * * *